United States Patent
McNulty et al.

(10) Patent No.: US 12,420,918 B2
(45) Date of Patent: Sep. 23, 2025

(54) ROTOR BLADE TRACKING WEDGE WITH POROUS ELEMENTS

(71) Applicant: HAYMATT, L.L.C., Phoenix, AZ (US)

(72) Inventors: Michael J. McNulty, Scottsdale, AZ (US); Robert T. Loftus, Gilbert, AZ (US)

(73) Assignee: HAYMATT, L.L.C., Phoenix, AZ (US)

( * ) Notice: Subject to any disclaimer, the term of this patent is extended or adjusted under 35 U.S.C. 154(b) by 12 days.

(21) Appl. No.: 18/133,748

(22) Filed: Apr. 12, 2023

(65) Prior Publication Data
US 2023/0331377 A1    Oct. 19, 2023

Related U.S. Application Data

(60) Provisional application No. 63/330,559, filed on Apr. 13, 2022.

(51) Int. Cl.
*B64C 27/00* (2006.01)
*B64C 11/00* (2006.01)

(52) U.S. Cl.
CPC .......... *B64C 27/001* (2013.01); *B64C 27/008* (2013.01); *B64C 11/008* (2013.01)

(58) Field of Classification Search
CPC ..... B64C 27/001; B64C 27/008; B64C 21/02; B64C 21/025; B64C 21/04; B64C 21/06; B64C 21/08; B64C 2230/04; B64C 2230/06; B64C 2230/22; B64C 2230/28;
(Continued)

(56) References Cited

U.S. PATENT DOCUMENTS 3,779,338 A * 12/1973 Hayden ................. F04D 29/388
                                                        244/1 N
8,192,162 B2    6/2012 Loftus et al.
(Continued)

FOREIGN PATENT DOCUMENTS

CN    109665091 A *  4/2019 ............. B64C 21/02

OTHER PUBLICATIONS

Rossian, Ewert, and Delfs, "Numerical Investigation of Porous Materials for Trailing Edge Noise Reduction" (International Journal of Aeroacoustics, 2020, vol. 19 (6-8) 347-364).

*Primary Examiner* — Nicholas McFall
*Assistant Examiner* — Justin Michael Heston
(74) *Attorney, Agent, or Firm* — BYCER & MARION, PLC; Matthew L. Bycer

(57) ABSTRACT

Rotor blades may be modified with field-installable profiles, or wedges towards the rear trailing end. The wedges may incorporate one or more porous sections to enhance fluid flow through the wedge, and thus reduce trailing edge noise and rotor vibrations when the rotors are in use. The use of porous materials on the trailing end of the blade and/or wedge reduces the intensity of high-frequency noise. A portion of the wedge may retain impermeable characteristics and be paired with a more porous section to minimize the boundary layer, and thus reduce noise. The wedges may be installed in the field, and easy removed, replaced, and/or applied manually to the rotor blade trailing edge. As the vehicle is used, the placement and choice of location and number of wedges applied to one or more rotor blades may be modified each time the vehicle rotor blade come to rest.

21 Claims, 11 Drawing Sheets

Blade Airfoil Cross Section

(58) Field of Classification Search
CPC ....... B64C 23/04; B64C 23/06; B64C 11/008; B64C 11/20
See application file for complete search history.

(56) References Cited

U.S. PATENT DOCUMENTS

2010/0028151 A1* 2/2010 Loftus ................... B64C 27/008
 416/144
2022/0009623 A1 1/2022 Loftus

* cited by examiner

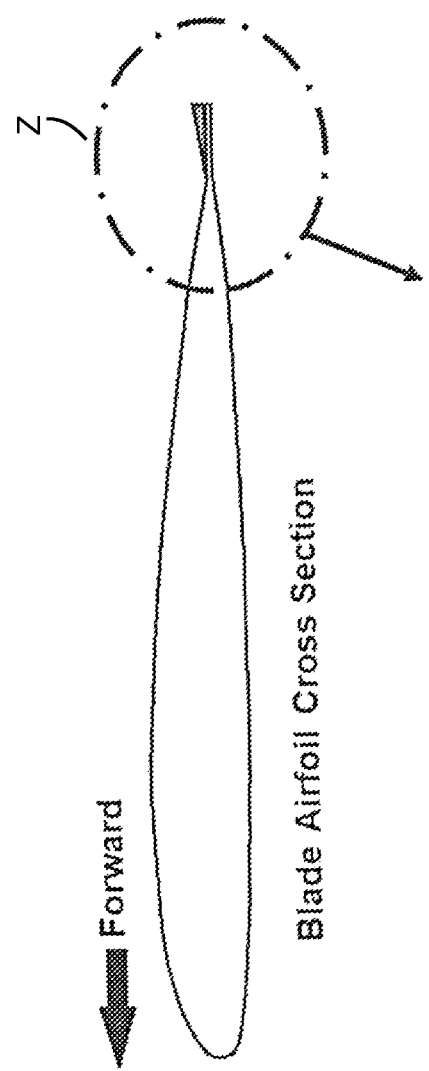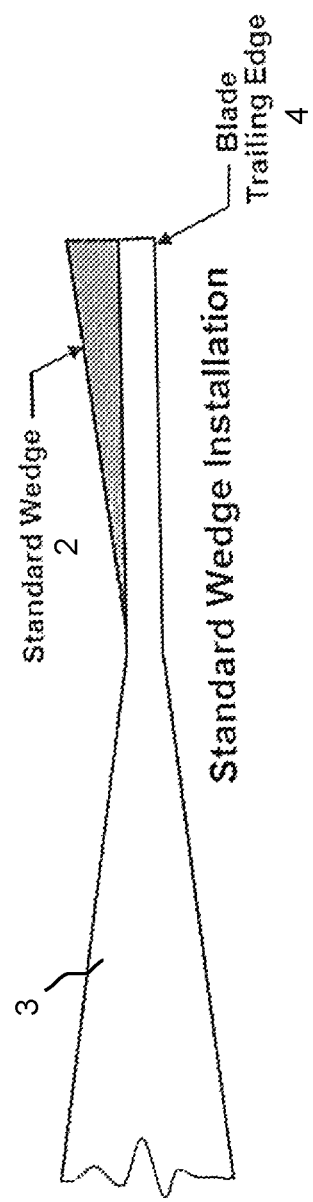

ROTOR BLADE TRACKING WEDGE WITH POROUS ELEMENTS

CLAIM OF PRIORITY

The present application includes subject matter disclosed in and claims priority to a provisional application entitled "Rotor Blade Tracking Wedge with Porous Elements for Sound Reduction" filed Apr. 13, 2022 and assigned Ser. No. 63/330,559, describing an invention made by the present inventors, herein incorporated by reference.

FIELD OF THE INVENTION

The present invention is directed to noise turbulence mitigating improvements to helicopter rotor blades. More particularly, the present invention is directed to rotor wedges configured for convenient removal and reattachment, for easy field adjustments and simulations.

BACKGROUND

Aerodynamic noise is typically generated either by aerodynamic forces acting on a surface, or by flow turbulence and vortices. Flow turbulence refers to the chaotic and unpredictable movement of a fluid, such as air or water. When fluid flows past an object, vortices and eddies may develop, disrupting the smooth flow of the fluid. This disruption may result in fluctuations in velocity, pressure, and other fluid properties.

Turbulent boundary layer flow is a particular type of flow turbulence in which a thin layer of fluid adjacent to a surface, such as the surface of an airplane wing or a wind turbine, becomes turbulent. In this type of flow, the fluid closest to the surface is affected by friction, causing it to slow down and creating a thin layer of slow-moving fluid. When flow turbulence interacts with a surface, the flow turbulence generates chaotic or random pressure fluctuations on said surface. When these pressure fluctuations encounter a sudden change in boundary conditions, energy is scattered.

Particularly, when a turbulent boundary layer flow passes the sharp edge of a finite flat surface or passes an airfoil, energy scattering occurs. When the energy is scattered, strong turbulent kinetic energy transforms into acoustic energy and propagates aerodynamic noise to the far field. This aerodynamic noise is called turbulent boundary layer trailing-edge noise, or trailing-edge noise. Trailing-edge noise is a considerable factor in wind turbine noise, marine propeller noise, rotorcraft noise, turbomachinery blade noise, automobile fan noise, etc. In some cases, trailing-edge noise is the most dominant noise source.

Noise mitigation solutions include serrating the trailing edge to break up airflow, modifying the flow pattern at the leading edge such that there is less turbulence at the trailing edge, using active noise reduction techniques, such as microphones and speakers, to cancel out the trailing edge noise, and using passive noise reduction techniques such as soundproofing the interior of a helicopter to block trailing edge noise.

Other techniques for mitigating trailing-edge noise, particularly noise turbulence brought about by rotor-tracking wedges, include alternate rotor-tracking wedge geometry. Trim tabs, which are small bendable surfaces attached to the main control surfaces, have been used to approach this issue. On helicopters, trim tabs may be bent to alter the aerodynamic pitching moment at a specific location on the rotor blade, such that vibration is reduced. More recently, helicopter rotor blade vibration and blade tracking devices, particularly field-installable and removable rotor tracking wedges, such as those disclosed in U.S. Pat. No. 8,192,162 (herein incorporated by reference), offer an alternative to the labor, and location dependent, rotor alterations. Alternate shapes have been designed to reduce noise, such as those found in US Patent Publication No. 20220009623 for sound-reducing rotor blade wedge profiles (herein incorporated by reference).

Disadvantages of trim tabs include but are not limited to that they are difficult to adjust accurately, they are prone to failure, and they are expensive to incorporate and repair, Other alternatives to trim tabs include weights and ramp tabs. While weights do affect helicopter vibration, they are not sensitive to the aircraft speed and so are generally used only for hover vibration control.

Ramp tabs are small metal or composite plates permanently attached to the trailing edge of the main rotor blades of a helicopter. They may be used to adjust the aerodynamics of rotor blades during flight. Importantly, ramp tabs may be used to compensate for changes in air speed. Ramp tabs are preferable to weights for reducing vibration as they enable the aircraft's performance to be fine-tuned as needed.

Practically, ramp tab installation and operation pose significant challenges. Firstly, because ramp tabs are installed with a permanent epoxy adhesive, they are difficult to remove once installed. When removing ramp tabs after the epoxy adhesive has bonded, either the ramp tab or helicopter blade surface will be destroyed. Because of the complications involved in removing ramp tabs, it is difficult to remove and reinstall ramp tabs in a field environment to reduce vibration with changing conditions.

Rotor tracking wedges such as, U.S. Pat. No. 8,192,162, are preferable over other methods of reducing helicopter vibration as they are easily installed and removed, yet they adequately reduce helicopter vibrations and improve blade-to-blade track runout. Unfortunately, rotor tracking wedges may produce some undesired high-frequency trailing edge noise. The quest to reduce wedge noise and rotor vibrations is a continued process of iterative improvements. Therefore, it is the object of the present invention to disclose a method and material for the fabrication of rotor tracking wedges such that trailing edge noise may be reduced while maintaining their vibration reduction properties.

SUMMARY OF THE INVENTION

The present invention is directed to a device and method for reducing noise turbulence created by helicopter main rotor blades, by use of a system of attachable and detachable rotor wedges that adhere to the rotor blade trailing end. The rotor wedges may be made from or of porous and/or permeable portions. In some embodiments, the helicopter rotor blade(s) themselves may include porous and/or permeable portions as well. The porous wedges may be designed to complement the density/porosity of blade trailing edge(s) of such blades. The attachable rotor wedge(s) may have a porous portion that is more, or less, porous than the porosity of the rotor blade(s). The porous portions, in both the rotor blades and the rotor wedges, may have gradations of porosity such that porosity and permeability are not uniform throughout the material. If necessary, the rotor wedges may be removed and reattached to allow for field adjustments throughout their lifespan.

The rotor wedges preferably include at least one porous portion. In some embodiments, the entire rotor wedge may include a porous material. The porous portion of the rotor wedge or the entire rotor wedge may be comprised of materials having gradations of porosity, such that the porosity varies throughout the material. The porosity of the wedge may match, be less than, or more than, or both denser and less dense than (portions of) the blade. The wedge material may become more porous as the distance from the rotor blade increases, or the distance towards the trailing edge decreases or increases. Alternatively, the material may become less porous as the distance from the rotor blade increases. The rotor wedge may include a material having gradations of porosity such that different sections of the wedge have different porosities and permeabilities.

The porous portion of the rotor wedge may be set adjacent to the blade, or the non-porous portion of the wedge may be set adjacent to the blade. Additionally, the porous section of the blade may have a graded porosity. The rotor wedge may have a portion sealed with a sealant such that it is impermeable and protected from damage.

BRIEF DESCRIPTION OF THE DRAWINGS

The present invention will be described with greater specificity and clarity with reference to the following drawings, in which:

FIG. 1 illustrates a side cross-sectional view of a prior art wedge applied to an airfoil;

FIG. 2 illustrates a magnified side cross-sectional view of the circle Z from FIG. 1 of a prior art wedge installed on a rotor blade trailing end;

DETAILED DESCRIPTION

Figure 3:
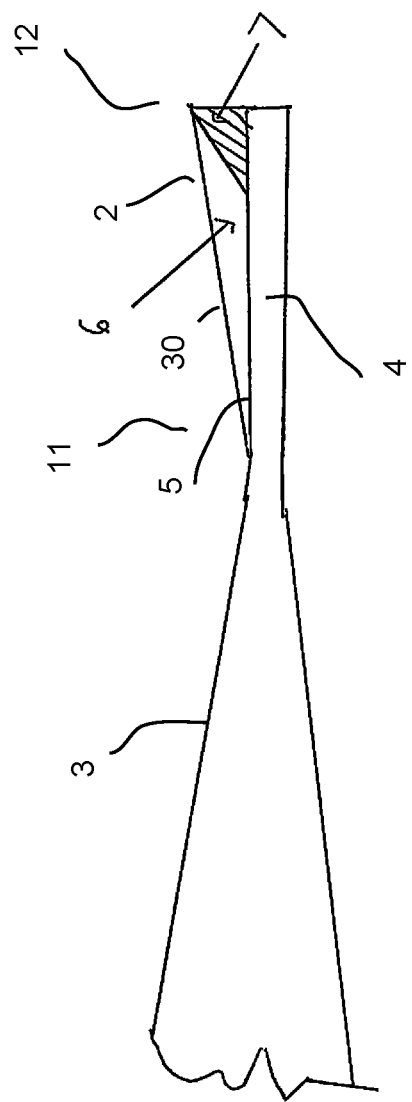
FIG. 3 illustrates a side cross-sectional view of an embodiment of the disclosed wedge, attached to an airfoil.

Rotor smoothing wedges (wedges) attach to airfoils to manage rotor-induced vibration and to optionally track the helicopter blades. In some cases, when tracking wedges are installed on an airfoil, the shed wake behind the airfoil produces a high-frequency tone. Shed wake being the region of turbulent airflow and vortices that is shed from the trailing edge of the blade as it moves through the air. Alternative wedge profiles have been developed that mitigate this noise, U.S. patent application Ser. No. 17/369,238 and U.S. Pat. Publ. No. 2022/0009623 (both U.S. Pat. No. 8,192,162 and U.S. Pat. Publ. No. 2022/0009623 herein incorporated by reference). Additionally, alternative wedge materials may further facilitate noise reduction due to the shed wake. Porous and permeable materials alter aerodynamic and acoustic properties and are therefore preferable non-porous and non-permeable materials for rotor tracking wedge fabrication.

Materials with Graded Porosity and Permeability

In "Numerical Investigation Of Porous Materials For Trailing Edge Noise Reduction" by Rossian, Ewert, and Delfs (International Journal of Aeroacoustics, 2020 Vol. 19 (6-8) 347-364) (hereinafter "Rossian et al.") (herein incorporated by reference) calculated and simulated noise reduction results are presented for porous and permeable materials. Rossian et al. discusses use of porous materials to reduce trailing edge noise. Rossian et al. suggests that turbulence pressure compensation between the upper and lower airfoil of a porous trailing edge may impact turbulent flow.

It was previously understood that materials with locally varying permeability reduce trailing edge noise by providing a smooth transition from the solid airfoil to the free flow in the wake. Rossian et al. may have discovered that the reduction of high-frequency excess noise is not only due to the smoothing effects of porous, permeable materials, but may also be due to an alternated turbulence and mean flow field based on the flow passing through the porous section. Therefore, a preferred material for achieving maximum noise reduction may be a graded porous material that yields a locally varying permeability. It is worth noting that while graded materials are preferable, materials with strong local permeability gradients may act as additional noise sources.

The smoothing influence of the porous materials on the turbulence at the airfoil trailing edge only explains part of the effect porous, permeable materials have on trailing edge noise, and does not fully explain the potential noise reduction of wedges fashioned from porous and permeable materials. In fact, in some models, simulation results modeling turbulence reconstruction based on the solid flow field, the materials with the lowest permeability provided the highest noise reduction. Such results are inconsistent with theories based on the smoothing properties of such materials.

Incorporation of porous materials alters the flows boundary conditions and so can reduce the radiated noise. When evaluating the noise tampering effects of materials with locally varying permeability and porosity, for example with materials with a low permeability at the intersection between the wedge and blade surface, and a high permeability wedge set at the trailing edge, the noise generated at the solid-porous (blade-wedge) intersection is drastically reduced. Rather than the trailing edge being a distinct dominant noise source location, an acoustic wave is built over the entire period that the vortex passes above the porous section of the airfoil (alone, or with wedge attached). Thereby, the conversion to acoustic energy is distributed, helping to reduce the maximum pressure level, and noise.

Such results indicate that graded structures may help to dissipate kinetic energy from the turbulent air, reducing the intensity and duration of turbulent eddies, and thereby reducing noise turbulence. These effects are particularly beneficial in situations where air turbulence can be disruptive or even dangerous. Noise reduction is an important aspect of helicopter design.

Wedge Design and Function

The disclosed wedge embodiments, and those reasonably understood through the teachings set forth herein, fashioned from porous, permeable materials, are meant to reduce trailing edge noise while granting users the flexibility to selectively affix the wedges to their preferred section of the rotor blade. Wedges according to present teachings may additionally function to alter the aerodynamic properties of the rotor blade to correct for improper tracking conditions. Depending on a given helicopter's design and baseline vibration levels, users may choose to affix one or more wedges to the top trailing edge of the blade, bottom trailing edge, along the span of the rotor blade. Adjustable wedges offer the further benefit of allowing for field adjustments, throughout the lifespan of the helicopter, without the need to remove the rotor blades from the helicopter body. Preferably, the wedges are affixed at or near the trailing edge on the blade airfoil chord, most preferably with a narrow profile forward in to the direction of oncoming airflow.

Porous, permeable material may be used to fashion the removable wedge so as to compliment any rotor blade that has a porous or permeable trailing edge. Depending on the intended use, geometric shape, mission profile, and turbulent flow patterns the wedge may be entirely comprised of porous, permeable material, or selected portions of the said wedge may be comprised of porous, permeable material. If the rotor blade trailing edge itself is comprised of porous, permeable materials, the accompanying porous, permeable wedge can or will compliment, complete, or continue the porosity gradient of the rotor blade.

The wedges may be fashioned from a variety of porous, permeable materials. Examples of such suitable metal sponge materials include but are not limited to, aluminum, such as PA80-110, PA200-250, PA200-250, permeable or the like other metals and metal alloys, open cell forms, selectively punctured closed cell forms, foamed EPDM, and other rubbers and rubberlike materials. The material may also attain a graded porosity through the use of additive manufacturing, for example by incorporating other materials such as rubbers, plastics, and/or silicones into the wedge.

When attached to the trailing end of the airfoil, the wedge modifies aerodynamic and acoustic properties because the turbulence and mean flow field are altered as air flows through pores of different sizes and permeabilities. This ultimately reduces noise compared to a wedge of the same shape and size, yet fashioned without a material comprised of porous and permeable materials. The wedge may be of a porous/permeable nature. The wedge may complement the porous nature of the rotor blade.

As defined herein, a porous medium or a porous material is a material containing pores (voids). The skeletal portion of the material is often called the "matrix" or "frame". The pores are typically filled with a fluid gas (ambient air). Other properties of the medium (e.g., permeability, tensile strength, electrical conductivity, tortuosity) can be derived from the respective properties of its constituents (solid matrix and fluid) and the media porosity and pores structure. The term porous may also include a poroelastic medium. Often both the solid matrix and the pore network (also known as the pore space) are continuous, so as to form two interpenetrating continua such as in a sponge. In a less preferred alternative, the porous material may be closed. More preferably, the porous material is permeable and allows for fluid flow through the porous medium (or media).

FIGS. 1-2 show diagrams of prior art airfoils and wedges with FIG. 1 showing blade-airfoil cross-section, and FIG. 2 showing standard wedge 2 installed on blade 3 trailing end 4. As shown in FIG. 2, standard wedges are comprised of non-porous non-permeable materials and are subject to trailing edge noise. FIG. 1 illustrates the cross-section of a standard wedge applied to an airfoil, and FIG. 2 illustrates a standard, "prior art" wedge installed on a rotor blade trailing edge magnified from FIG. 1 (circle Z).

FIGS. 3-14 show side cross-sectional views of rotor blade trailing edges having a wedge attached to the trailing edge, such as the magnified view of FIG. 2. The wedge, or other profile shape (the term wedge here used interchangeably with "profile" as a device attached to pre-existing rotor blades) may include a chord-wise permeability/porosity through the wedge, however, in certain embodiments, the porosity may change chord-wise in a single wedge. Porous/permeable wedge sections are shown with crossing lines, with areas of high-density porosity having crossing lines going in a positive direction (lower left to upper right), and areas of low-density porosity (or more permeability) having crossing lines pointing in a negative direction (lower right to upper left). Additionally, closely drawn lines show areas of greater porosity than areas where lines are drawn further apart. FIG. 3 shows a preferred embodiment of wedge 2, attached to airfoil 3, having a forward portion comprised of standard wedge-forming materials 6 and an aft element comprised of a porous and or/permeable material 7. In some embodiments, when referring to the forward and aft portions of the rotor wedge, forward portion 11 lies adjacent to rotor blade 3, while aft portion 12 may not contact rotor blade 3. Porous material(s) in wedge may reduce high-frequency noise.

Additionally, the change in porosity from the standard impermeable wedge material to a more porous wedge material may have other noise-mitigating mechanisms. The varying permeability from the standard material to the porous material provides a porosity/permeability gradient. Thereby, the conversion to acoustic energy is distributed, reducing the maximum pressure level, and noise.

Figure 4:
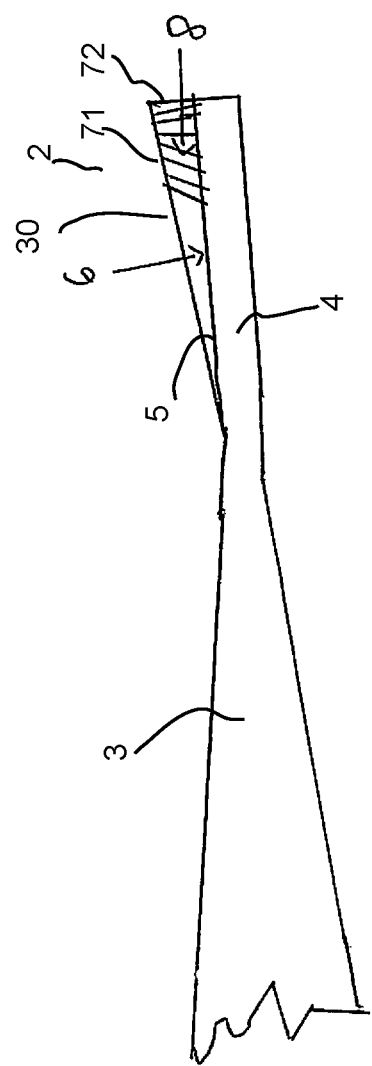
FIG. 4 illustrates a side cross-sectional view of an alternative embodiment of the disclosed wedge, attached to an airfoil.
Figure 5:
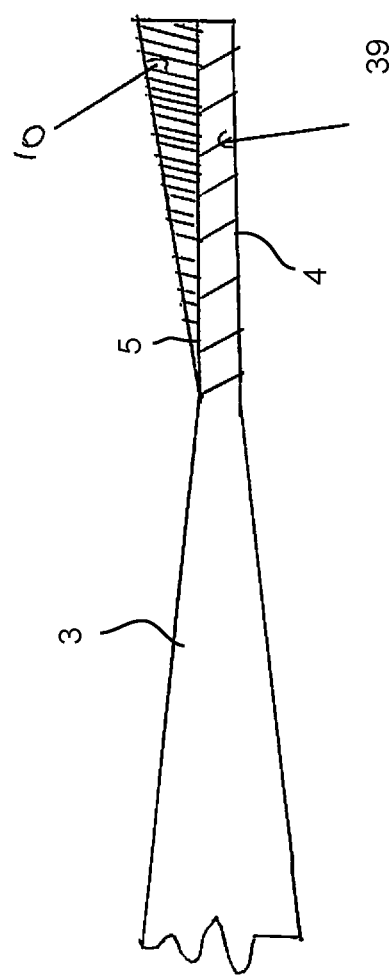
FIG. 5 illustrates a side cross-sectional view of an alternative embodiment of the disclosed wedge, attached to an airfoil.
Figure 6:
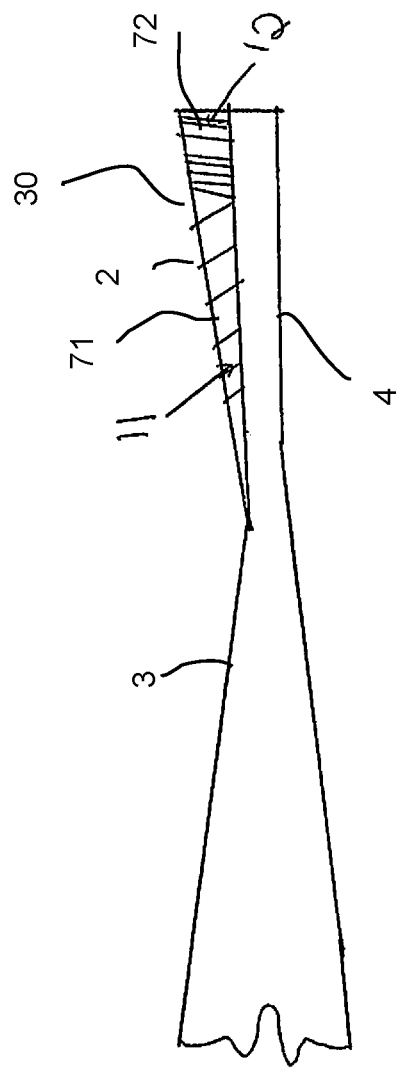
FIG. 6 illustrates a side cross-sectional view of an alternative embodiment of the disclosed wedge, attached to an airfoil.
Figure 7:
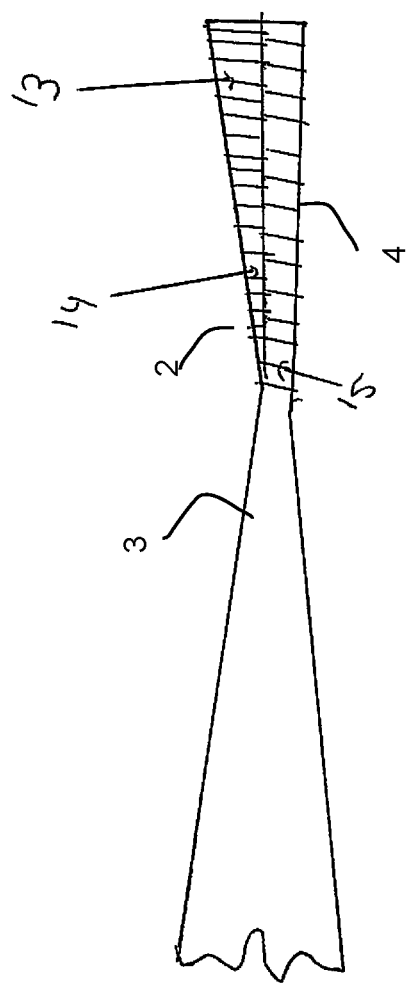
FIG. 7 illustrates a side cross-sectional view of an alternative embodiment of the disclosed wedge, attached to an airfoil.
Figure 8:
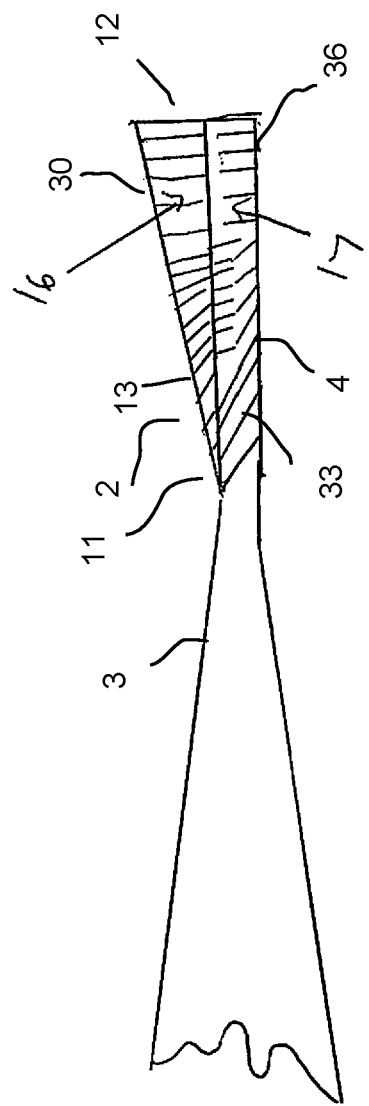
FIG. 8 illustrates a side cross-sectional view of an alternative embodiment of the disclosed wedge, attached to an airfoil.
Figure 9:
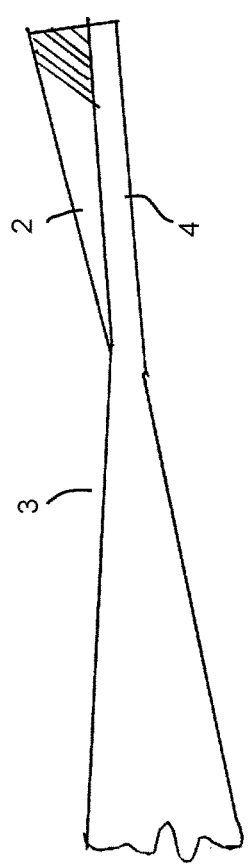
FIGS. 9-12 illustrate side cross-sectional views of embodiments of the disclosed wedges on airfoils.
Figure 10:
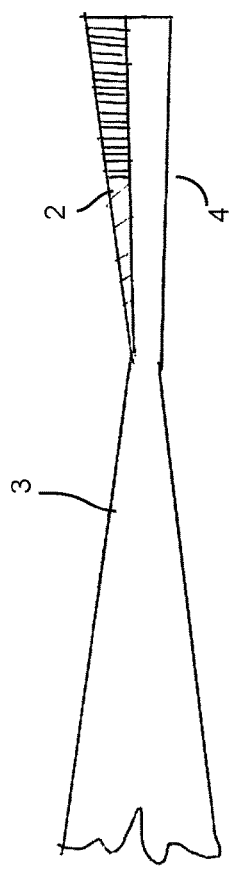
Figure 11:
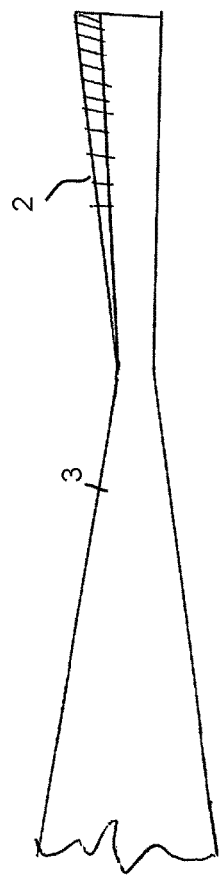
Figure 12:
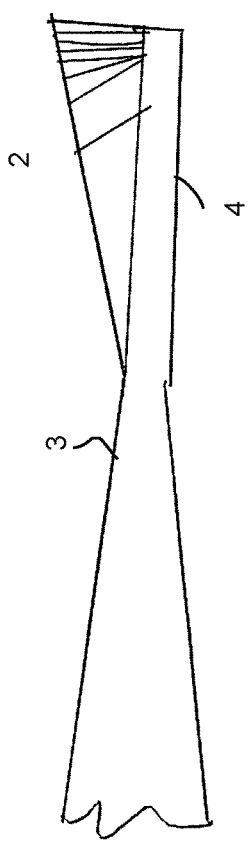
Figure 13:
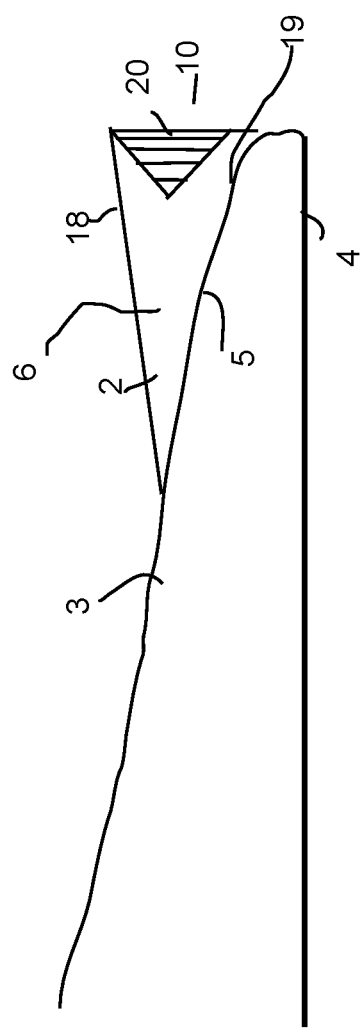
FIG. 13 illustrates a side cross-sectional view of an alternative embodiment of the disclosed wedge, attached to an airfoil.
Figure 14:
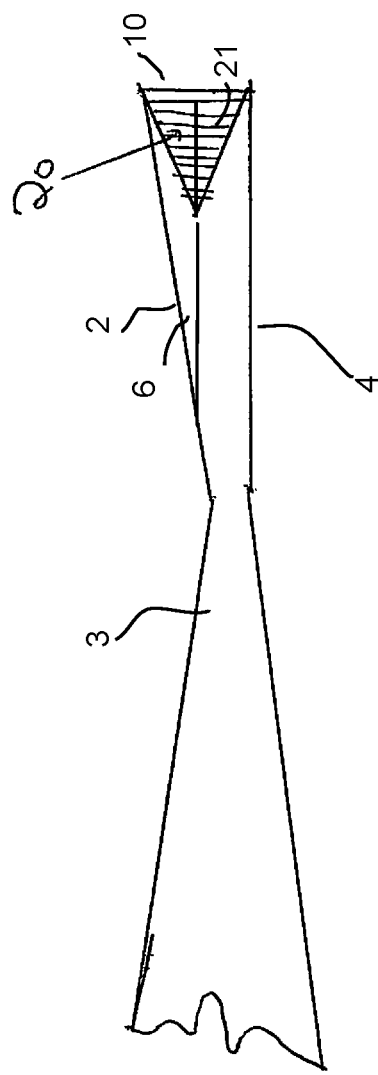
FIG. 14 illustrates a side cross-sectional view of an alternative embodiment of the disclosed wedge, attached to an airfoil.

FIG. 3 illustrates an embodiment of the disclosed wedge, attached to an airfoil, having a forward portion comprised of standard wedge-forming materials and an aft element comprised of a porous and or/permeable material, with an angled porous section with a majority of the porous section attached to a rotor blade top surface. FIG. 4 illustrates an embodiment of the disclosed wedge comprised of a forward portion fashioned from standard wedge-forming materials, and an aft portion fashioned from a graded porous/permeable material. FIG. 5 illustrates an embodiment of the disclosed wedge wherein the porosity of the wedge is denser than the porosity of the blade. FIG. 6 illustrates an embodiment of the disclosed wedge wherein the porosity in the forward portion of the wedge is less dense than the porosity in the aft portion of the wedge. FIG. 7 illustrates an embodiment of the disclosed wedge wherein the porosity gradient of the wedge is a continuation of the porosity gradient in the blade, such that both the blade and wedge are porous. FIG. 8 illustrates an embodiment of the disclosed wedge wherein the porosity gradient of the wedge mimics the porosity gradient of the blade. FIGS. 9-12 illustrate examples of embodiments of the disclosed wedges with varying porous portion size, varying gradations of porosity in their porous portions, and various angles of interface between their porous and non-porous portions. FIG. 13 illustrates an embodiment of the disclosed wedge wherein the wedge is comprised of a porous material located in the aft portion of the blade such that a wedge-shaped portion of the aft end of the wedge is comprised of a porous material. Reference numerals and portions of wedges that are similar throughout may be inferred to be read into each succeeding figure, with sections of the rotor blade and wedge, including wedge surfaces, the same throughout. FIG. 14 demonstrate the use of porous sections in positions/shapes on the wedge that complement porous sections on the blade.

As shown in FIG. 3, wedge 2 is shown with the entire top surface 30 of wedge 2 may be made of standard or impermeable material, while a portion thereunder is made of porous and/or permeable material 7. The incident wind on the wedge is deflected by the top surface 30, while resonant zone wind may permeate permeable section 7. As shown in FIG. 4, a preferred wedge 2 may be set on top surface 5 of blade 3, and wedge may be comprised of forward portion 11 fashioned from standard wedge-forming materials 6, and aft portion 12 fashioned from a graded porous/permeable material 8. The change in porosity from the standard wedge-forming material, followed by the additional change in porosity on the graded aft portion, with increasing porosity aft-wise, may have an increased noise-tapering effect. Less porous section 71 may mate with more porous section 72, with both sections exposed along top surface 30.

FIG. 5 shows a preferred wedge 2 embodiment wherein the porosity 8 in wedge 2 is denser than the porosity in rotor blade 39. Rotor blade trialing end 4 may be made of a porous material that is less porous than the wedge, the same, or more porous. In some embodiments, the porosity of the wedge gradually increases in the wedge and/or blade trailing end from the forward element to the aft element. In other embodiments, the porosity may be varied throughout both the forward and aft elements. FIG. 6 shows an example of a wedge 2 wherein the porosity in the forward portion 11 of the wedge is less dense 71 than the porosity in the aft portion 12 porosity 72. In this embodiment, the entire upper top surface 30 of wedge 2 is made of a porous material incident with incoming wind. FIG. 8 shows an embodiment of a wedge 2 and blade 3 wherein the porosity gradient in the aft portion 12 of wedge 2 mimics the porosity gradient in the front portion 11, set upon blade 3 with porous section 16 at trailing end.

FIG. 7 shows a wedge wherein the porosity gradient of the wedge is a continuation of the porosity gradient in the blade porous section 15, such that both the blade 3 and wedge 2 are porous of a near equivalent nature. The wedge may be more or less coarse than the blade, with a virtually identical averaged porosity. In other embodiments, the porosity gradient of the wedge 2 may mimic the porosity gradient of the blade portion 15. Forward portion 11 of wedge 2 having a less dense section 14, while aft portion having a denser section 13, preferably with a gradient, but in some embodiments, the denser 14 and less dense portions may be comprised of two materials mated to one another. In some embodiments, sections of varied impermeable and/or porosity may be adhered separately to the blade. An example of such a fabrication can be seen in FIG. 8, with a tighter, more dense wedge fore section 13 and fore blade trailing end section 33, and the wedge rear or trailing end 16 and blade trailing end 36 becoming more porous, less dense. Either or both sections of wedge may match permeability/porosity of blade end. In some embodiments, a porous portion of the wedge is adjacent to the blade. In other embodiments, a non-porous section of the wedge may be adjacent to the blade.

In addition to the porosity gradient, the extent of the porous area and the angle of interface between porous and non-porous sections of the wedge may also alter the noise-tampering properties of said wedge. Examples of preferable wedges with varying porous portion size, varying gradations of porosity in their porous portions, and various angles of interface between their porous and non-porous portions are shown in FIGS. 9-12. As seen in FIGS. 9-12 the porous nature, and density thereof, may be modulated, or alternated between a density throughout, or a change in density as moving in the trialing end direction.

FIG. 13 shows an embodiment of the present invention wherein the upper surface 18 and lower surface 19 of wedge 2 include impermeable sections of standard material 6, while a triangular portion of the rear 10 of wedge with expanding porous section 20 expanding aft-ward. Additionally, FIG. 14 shows a preferred embodiment wherein wedge 2 includes a standard density material 6 with triangularly-shaped porous material 20 located in the aft portion of the blade, with the section of the porous material expanding in the trailing end direction. The porous material may be wedge-shaped, circular, semi-circular or otherwise shaped portion of the aft end of the whole wedge is comprised of a porous material. A porous section 21 of the blade 3 trialing end, matches and complements the shape of the porous section 20 in the wedge 2, to form a combined porous section with porous sections 20 and 21 complemented and interacting with the airflow in combination. As seen in FIG. 13, the rear portion 12 of wedge 2 may be set upon blade 3 with a larger section of porous material 20 in contact with the upper surface 30 of blade 3. The porous section 21, may expand in the rear direction. In some embodiments, the porous section of the wedge may be surrounded by a solid boundary comprising the remainder of the wedge. It is thought that the porous section aft-ward in the wedge profile may provide less resistance to moving air. The combination of a top side of the wedge with a standard porosity/density, over the more porous section of the wedge is thought to shield portions of the porous section of the wedge resulting in a minimized the boundary layer, and thus reduce noise. The porous section of the wedge may extend down to the top surface, or may be set within (and exposed on a trailing edge). The lower edge of the (forward portion of the) wedge is placed in contact with the top surface of the blade, and it may be required to have a denser nature to ensure that the wedge properly adheres to the blade. Preferably, the entire wedge will be comprised of gradations of porous material, such that the porous portion described above, is the most porous section of the blade. In some embodiments, the most porous section of the wedge is the section furthest from the blade.

Figure 19:
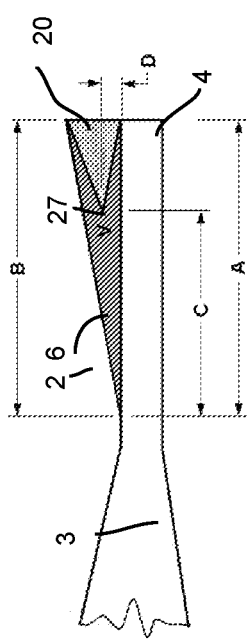

As shown in FIGS. 15-19, wedge 2 set on blade 3 trailing end 4, with wedge lower surface 19 mating with top surface 5 of blade, preferably by an adhesive layer. The adhesive layer is presumed to be along the lower surface 19 whether denoted or shown or not in all figures where the wedge lower surface 19 mates with top surface 5 of blade trailing end 4. Wedge 3 includes overall length E wherein the length B of standard material 6 at the top 18 of wedge is shown in relation to length A of standard material at bottom 19 of wedge, lengths A and B being the same as shown in FIG. 19, or as shown in FIGS. 15-18 varied. Length B demotes the length of impermeable section at top of wedge. Length C indicates the minimal length of impermeable section wedge. Length A may be shorter (more standard material at top, less porous material along bottom) or longer (less standard material along top) than length B. Additional shapes of porous section(s) in the wedge may be shown, with a third length C related to the distance between front end 11 of wedge 2 and the most forward reaching porous section 27 or porous section 20. The change in the shape of the porous element 20 may be set at a set height D, where the most forward portion of porous section 27 is set at height D.

Figure 15:
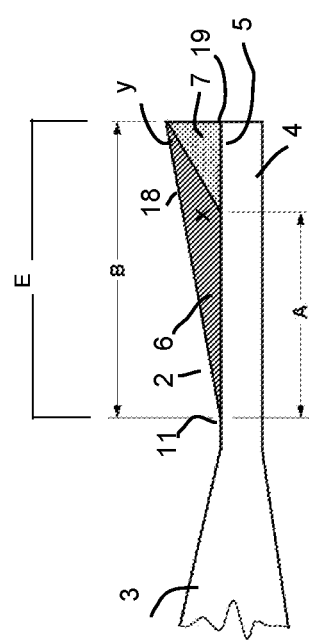
FIGS. 15-19 illustrate side cross-sectional views of alternative embodiments of the disclosed wedge, attached to an airfoil.
Figure 16:
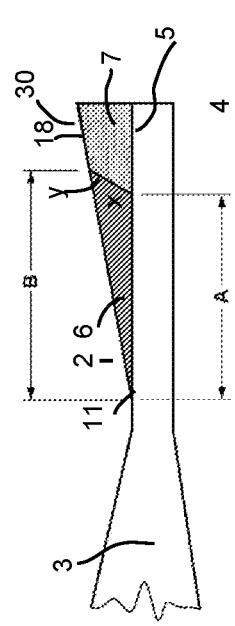
Figure 17:
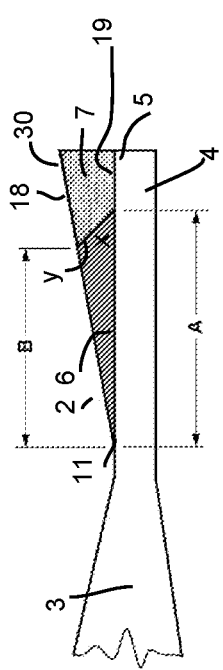
Figure 18:
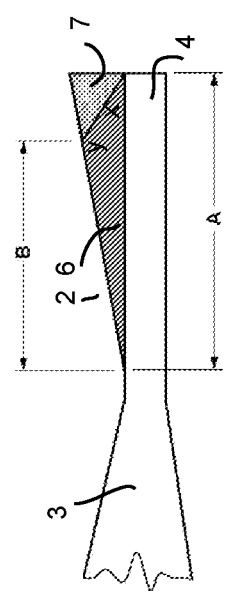

The shape of permeable or porous section 7 in wedge 2 may be helpful in reducing incident noise when paired with standard or impermeable wedge sections 6. Incident angle, angle x may form the shape of the lower portion of the wedge as it transitions from impermeable to porous. For instance, as shown in the embodiment of FIG. 15, angle x is obtuse and is formed within the wedge at the interface between impermeable 6 and porous 7 sections. Angle y may be used to show the incident top angle. As seen in FIG. 15, the impermeable section extends to the top right corner 39 forming the angle y with the porous section 6. When the impermeable section extends only partially aft ward, as shown in FIG. 6, angle x may be obtuse (as shown in FIG. 16, or acute, as shown in FIG. 17), wherein portion f the top surface 30 of wedge 2 are exposed and made from the porous material. Angle y may be acute (as shown in FIG. 16 or obtuse (as shown in FIG. 17) or at a right ninety-degree angle. As shown in FIG. 19, angle v may be formed of an angle greater than one hundred-eighty degrees when a triangular shaped section extends within impermeable sections 6 to most forward porous section element 27. The exact straight lines may be modified depending on the materials used, but it is considered preferable that the impermeable and permeable sections are mated without excessive gaps set therebetween.

In some embodiments, the portions of the wedge may be sealed with a sealant including but not limited to a polyurethane sealant, a silicone sealant, a rubber sealant, an epoxy sealant, a butyl rubber sealant, and a bituminous sealant, or the like. The sealant may form the adhesive layer detachably attaching the wedge to blade. The adhesive may be a continuous planar boy, or more preferably, when used with a porous blade structure, include sections that are not planar, that may be continuous (e.g., linear, two-planar shapes, etc.) or separate sections (e.g., dotted, or random sections applied). Alternatively, the adhesive layer may dry in a porous film. The sealant may serve to protect the wedge from environmental damage, such as, but not limited to UV damage, weather damage, and water damage.

Porous sections of the wedge, or the entire wedge, may include porous aluminum, such as porous aluminum, porous plastic, ceramic, or other material. The bottom surface of the wedge may include a solid layer of impermeable material to enhance adherence to the top surface of the rotor blade. Alternatively, the lower surface of the wedge may be porous and/or coarse, and an adhesive may be selected to fit into pores on the bottom surface volume of the wedge. The adhesive may extend beyond the lower surface of the wedge and adhere to the blade top surface. Alternatively, pores in the bottom surface of the wedge may be filled with an adhesive, such that when placed on the rotor blade surface, porous section adhere to the rotor blade surface, and other sections of the wedge are set adjacent the blade surface without adhesive set between wedge and blade. A top of the wedge may be impermeable, with a portion set thereunder porous to enhance the permeability of air set through the wedge under the top side.

We claim:

1. A detachably attachable wedge for a rotor blade of a helicopter for reducing blade pitching moment dynamic unbalance and aircraft vibrations, said wedge comprising:
   a. an adhesive layer coupling a surface of a rotor blade and a surface of the wedge;
   said wedge comprising at least a first porous and/or permeable section;
   wherein an incident angle of the at least first porous and/or permeable section is obtuse or acute.

2. The detachably attachable wedge for a rotor blade of claim 1 wherein the helicopter rotor blade includes a trailing end section comprised of a second porous and/or permeable section.

3. The detachably attachable wedge for a rotor blade of claim 2 wherein said second porous and/or permeable section is attached to the wedge via the adhesive layer.

4. The detachably attachable wedge for a rotor blade of claim 3 wherein said second porous and/or permeable section is attached along the at least first porous and/or permeable section of the wedge.

5. The detachably attachable wedge for a rotor blade of claim 3 wherein the at least first porous and/or permeable portion of the wedge is more porous and/or permeable than the second porous and/or permeable portion of the helicopter rotor blade.

6. The detachably attachable wedge for a rotor blade of claim 3 wherein the at least first porous and/or permeable portion of the wedge is less porous and/or permeable than the second porous and/or permeable portion of the helicopter rotor blade.

7. The detachably attachable wedge for a rotor blade of claim 1 wherein the wedge may be continuously removed and reattached to the helicopter rotor blade.

8. The detachably attachable wedge for a rotor blade of claim 1 wherein the wedge is comprised of at least a first porous and/or permeable section and at least one additional section of a different porosity than the at least first porous and/or permeable section.

9. The detachably attachable wedge for a rotor blade of claim 1 wherein the at least first porous and/or permeable section has gradations of porosity, including an impermeable section, such that the porosity and permeability are not uniform throughout the wedge.

10. The detachably attachable wedge for a rotor blade of claim 1 wherein an entire top surface of the wedge is made of an non-porous impermeable section.

11. The detachably attachable wedge for a rotor blade of claim 10 wherein a non-porous, impermeable portion of the wedge is adjacent to the helicopter rotor blade.

12. The detachably attachable wedge for a rotor blade of claim 1 wherein the at least first porous and/or permeable section is more porous and/or permeable than the helicopter rotor blade.

13. The detachably attachable wedge for a rotor blade of claim 1 wherein the incident angle is acute and wherein a non-porous and/or impermeable section of the wedge extends along the lower side from the front to the aft of the wedge.

14. A method for altering the acoustic and/or vibratory nature of a working helicopter rotor blade, said method comprising the step of adhering a field installable wedge of claim 1 on a trailing end of the helicopter rotor blade, the wedge having at least a first porous section.

15. The method for altering the acoustic and/or vibratory nature of a working helicopter rotor blade of claim 14, further comprising the step of removing the wedge from the helicopter rotor blade with the adhesive layer.

16. The detachably attachable wedge for a rotor blade of claim 1 wherein the incident angle is obtuse and wherein a non-porous and/or impermeable section of the wedge extends along the lower side from the front to the aft of the wedge.

17. A detachably attachable wedge for a rotor blade of a helicopter for reducing blade pitching moment dynamic unbalance and aircraft vibrations, said wedge comprising:

a. an adhesive layer coupling a surface of a rotor blade and a surface of the wedge;

said wedge comprising at least a first porous and/or permeable section;

wherein the porous and/or permeable section comprises a material having gradations of porosity and/or permeability such that the material becomes gradually less porous and/or permeable as its distance from a top surface of the rotor blade increases.

18. The detachably attachable wedge for a rotor blade of claim 17 wherein the at least first porous and/or permeable section is less porous and/or permeable than the helicopter rotor blade.

19. A detachably attachable wedge for a rotor blade of a helicopter for reducing blade pitching moment dynamic unbalance and aircraft vibrations, said wedge comprising:

a. an adhesive layer coupling a surface of a rotor blade and a surface of the wedge;

said wedge comprising at least a first porous and/or permeable section;

wherein the at least first porous and/or permeable section forms a triangular section on a rear of the wedge.

20. A method for altering the acoustic and/or vibratory nature of a working helicopter rotor blade, said method comprising the step of:

adhering a field installable wedge of claim 19 on a trailing end of the helicopter rotor blade, the wedge having at least a first porous section.

21. The method for altering the acoustic and/or vibratory nature of a working helicopter rotor blade of claim 20, further comprising the step of removing the wedge from the helicopter rotor blade with the adhesive layer.

\* \* \* \* \*